US00RE47279E

(19) United States
(12) Reissued Patent
Salonen

(10) Patent Number: US RE47,279 E
(45) Date of Reissued Patent: Mar. 5, 2019

(54) METHOD AND SYSTEM FOR SENDING MESSAGES

(71) Applicant: BOOKIT OY AJANVARAUSPALVELU, Helsinki (FI)

(72) Inventor: Jukka Kalevi Salonen, Luhtijoki (FI)

(73) Assignee: BOOKIT OY AJANVARAUSPALVELU, Helsinki (FI)

(21) Appl. No.: 15/373,531

(22) Filed: Dec. 9, 2016

Related U.S. Patent Documents

Reissue of:
(64) Patent No.: 8,825,774
Issued: Sep. 2, 2014
Appl. No.: 13/002,512
PCT Filed: Jul. 3, 2009
PCT No.: PCT/FI2009/050611
§ 371 (c)(1),
(2) Date: Feb. 9, 2011
PCT Pub. No.: WO2010/000949
PCT Pub. Date: Jan. 7, 2010

U.S. Applications:
(63) Continuation of application No. 14/519,655, filed on Oct. 21, 2014, now Pat. No. Re. 46,653, which is an application for the reissue of Pat. No. 8,825,774.

(30) Foreign Application Priority Data

Jul. 4, 2008 (FI) ..... 20085701

(51) Int. Cl.
*G06F 15/16* (2006.01)
*H04M 15/00* (2006.01)
(Continued)

(52) U.S. Cl.
CPC ..... *H04M 15/61* (2013.01); *G06Q 10/02* (2013.01); *H04L 51/38* (2013.01);
(Continued)

(58) Field of Classification Search
CPC ..... H04L 51/38; H04W 4/14; H04W 4/24; H04M 3/42059; H04M 3/42382; H04M 15/61; H04M 2203/1058; G06Q 10/02
(Continued)

(56) References Cited

U.S. PATENT DOCUMENTS 5,592,666 A 1/1997 Perez
5,838,965 A 11/1998 Kavanagh et al.
(Continued)

FOREIGN PATENT DOCUMENTS

CN 1675637 A 9/2005
EP 0881802 A1 2/1998
(Continued)

OTHER PUBLICATIONS

Bmd wireless AG; Wirelss Application Messaging Serivce; Unknown 2004.

(Continued)

*Primary Examiner* — Ovidio Escalante
(74) *Attorney, Agent, or Firm* — Barnes & Thornburg LLP

(57) ABSTRACT

The present publication discloses a method and system for sending messages in a telecommunications network. In the method, a first text-form message is sent to a user of the service, a reply to the first text-form message is received from the user of the service to an address defined in the previous message, if the reply is of the correct form and content, the desired service is sent to the user of the service. According to the invention, the user of the message service is offered a second service by a message, the information (such as the sending number is text-message traffic) defining the reply address of which differs from that of the first message, and the second offer message is sent with a sending delay, which depends of the content or type of the first service.

26 Claims, 5 Drawing Sheets

(51) Int. Cl.

| | |
|---|---|
| ***H04W 4/14*** | (2009.01) |
| ***H04M 3/42*** | (2006.01) |
| ***H04W 4/24*** | (2018.01) |
| ***G06Q 10/02*** | (2012.01) |
| ***H04L 12/58*** | (2006.01) |

(52) U.S. Cl.
CPC ... *H04M 3/42059* (2013.01); *H04M 3/42382* (2013.01); *H04W 4/14* (2013.01); *H04W 4/24* (2013.01); *H04M 2203/1058* (2013.01)

(58) Field of Classification Search
USPC ..... 709/206, 204, 205, 207
See application file for complete search history.

(56) References Cited

U.S. PATENT DOCUMENTS

| | | | |
|---|---|---|---|
| 5,940,818 | A | 8/1999 | Malloy et al. |
| 5,987,467 | A | 11/1999 | Ross et al. |
| 6,003,036 | A | 12/1999 | Martin |
| 6,085,100 | A | 7/2000 | Tarnanen |
| 6,104,870 | A | 8/2000 | Frick et al. |
| 6,199,076 | B1 | 3/2001 | Logan et al. |
| 6,236,968 | B1 | 5/2001 | Kanevsky et al. |
| 6,539,360 | B1 | 3/2003 | Kadaba |
| 6,560,456 | B1 | 5/2003 | Lohtia et al. |
| 6,564,261 | B1 | 5/2003 | Gudjonsson et al. |
| 6,625,461 | B1 | 9/2003 | Bertacchi |
| 6,639,919 | B2 | 10/2003 | Kroninger et al. |
| 6,772,336 | B1 | 8/2004 | Dixon, Jr. |
| 6,873,688 | B1 | 3/2005 | Aarnio |
| 6,990,332 | B2 | 1/2006 | Vihinen |
| 7,149,537 | B1 | 12/2006 | Kupsh et al. |
| 7,154,060 | B2 | 12/2006 | Rosenbaum et al. |
| 7,222,081 | B1 | 5/2007 | Sone |
| 7,406,429 | B2 | 7/2008 | Salonen |
| 7,451,118 | B2 | 11/2008 | McMeen et al. |
| 7,610,208 | B2 | 10/2009 | Salonen |
| 7,610,224 | B2 | 10/2009 | Spiegel |
| 7,619,584 | B2 | 11/2009 | Wolf |
| 7,660,397 | B2 | 2/2010 | Heen et al. |
| 7,844,674 | B2 | 11/2010 | Madams et al. |
| 7,996,023 | B2 | 8/2011 | McGary et al. |
| 8,050,664 | B2 | 11/2011 | Salonen |
| 8,145,245 | B2 | 3/2012 | Aulu |
| 8,359,242 | B2 | 1/2013 | Guillot |
| 2001/0037264 | A1 | 11/2001 | Husemann et al. |
| 2001/0049785 | A1 | 12/2001 | Kawan et al. |
| 2002/0028686 | A1 | 3/2002 | Kagi |
| 2002/0032589 | A1 | 3/2002 | Shah |
| 2002/0059146 | A1 | 5/2002 | Keech |
| 2002/0080822 | A1 | 6/2002 | Brown et al. |
| 2002/0104007 | A1 | 8/2002 | Moodie et al. |
| 2002/0111914 | A1 | 8/2002 | Terada et al. |
| 2002/0128908 | A1 | 9/2002 | Levin et al. |
| 2002/0165000 | A1 | 11/2002 | Fok |
| 2002/0173319 | A1 | 11/2002 | Fostick |
| 2002/0180696 | A1 | 12/2002 | Maritzen et al. |
| 2002/0184509 | A1 | 12/2002 | Scheidt et al. |
| 2002/0188562 | A1 | 12/2002 | Garashi et al. |
| 2002/0191795 | A1 | 12/2002 | Wills |
| 2003/0005126 | A1 | 1/2003 | Schwartz et al. |
| 2003/0101071 | A1 | 5/2003 | Salonen |
| 2003/0163536 | A1 | 8/2003 | Pettine, Jr. |
| 2003/0211844 | A1 | 11/2003 | Omori |
| 2004/0097247 | A1 | 5/2004 | Vilkuna et al. |
| 2004/0128158 | A1 | 7/2004 | Salonen |
| 2004/0128173 | A1* | 7/2004 | Salonen ..... 705/5 |
| 2004/0139318 | A1* | 7/2004 | Fiala et al. ..... 713/165 |
| 2004/0157628 | A1 | 8/2004 | Daniel et al. |
| 2004/0185883 | A1* | 9/2004 | Rukman ..... 455/466 |
| 2004/0198322 | A1 | 10/2004 | Mercer |
| 2005/0027608 | A1 | 2/2005 | Wiesmuller et al. |
| 2005/0044042 | A1 | 2/2005 | Mendiola et al. |
| 2005/0054286 | A1 | 3/2005 | Kanjilal et al. |
| 2005/0065995 | A1 | 3/2005 | Milstein et al. |
| 2005/0102230 | A1 | 5/2005 | Haidar |
| 2005/0171738 | A1 | 8/2005 | Kadaba |
| 2005/0246209 | A1 | 11/2005 | Salonen |
| 2005/0268107 | A1 | 12/2005 | Harris et al. |
| 2006/0010085 | A1 | 1/2006 | McMeen et al. |
| 2006/0040682 | A1 | 2/2006 | Goertz et al. |
| 2006/0075139 | A1 | 4/2006 | Jungck |
| 2006/0131385 | A1 | 6/2006 | Kim |
| 2006/0168064 | A1 | 7/2006 | Huynh et al. |
| 2006/0224407 | A1 | 10/2006 | Mills |
| 2006/0271551 | A1 | 11/2006 | Suojasto |
| 2007/0010266 | A1 | 1/2007 | Chaudhuri |
| 2007/0047533 | A1 | 3/2007 | Criddle et al. |
| 2007/0105536 | A1 | 5/2007 | Tingo, Jr. |
| 2007/0123246 | A1 | 5/2007 | Daniel et al. |
| 2007/0135101 | A1 | 6/2007 | Ramati et al. |
| 2007/0143230 | A1 | 6/2007 | Narainsamy et al. |
| 2007/0239578 | A1 | 10/2007 | Gaida |
| 2007/0288215 | A1 | 12/2007 | Goldman |
| 2008/0147408 | A1 | 6/2008 | Palma et al. |
| 2008/0256191 | A1 | 10/2008 | Murphy et al. |
| 2008/0285475 | A1 | 11/2008 | Menditto |
| 2008/0317224 | A1 | 12/2008 | Salonen |
| 2009/0104925 | A1 | 4/2009 | Aula |
| 2009/0175422 | A1 | 7/2009 | Marics et al. |
| 2009/0264100 | A1 | 10/2009 | Sapir et al. |
| 2009/0281929 | A1 | 11/2009 | Boitet et al. |
| 2010/0030689 | A1 | 2/2010 | Ramos et al. |

FOREIGN PATENT DOCUMENTS

| | | | |
|---|---|---|---|
| EP | 0967754 | A2 | 12/1999 |
| EP | 1065899 | A1 | 3/2001 |
| EP | 1458201 | A1 | 9/2004 |
| EP | 1546938 | A1 | 6/2005 |
| EP | 1546938 | B1 | 9/2010 |
| FI | 20011680 | | 2/2003 |
| FI | 20011680 | A | 2/2003 |
| FI | 000117663 | B | 12/2006 |
| FI | 000117663 | B1 | 12/2006 |
| FI | 20060387 | | 10/2007 |
| FI | 20060387 | A | 10/2007 |
| FI | 000118586 | B | 12/2007 |
| GB | 2391646 | A | 6/2002 |
| GB | 2391646 | A | 11/2004 |
| GB | 2435565 | A | 8/2007 |
| KR | 20040013261 | A | 2/2004 |
| WO | 9706603 | A2 | 2/1997 |
| WO | 0041102 | A2 | 7/2000 |
| WO | 0052601 | A1 | 9/2000 |
| WO | 2001013299 | A2 | 2/2001 |
| WO | 0139033 | A1 | 5/2001 |
| WO | 0153991 | A1 | 7/2001 |
| WO | 2002067602 | A1 | 8/2002 |
| WO | 2004019223 | A1 | 3/2004 |
| WO | 2006122399 | A1 | 11/2006 |
| WO | 2007063179 | A1 | 6/2007 |
| WO | 2007122292 | A1 | 11/2007 |
| WO | 2007125171 | A1 | 11/2007 |
| WO | 2008017695 | A2 | 2/2008 |
| WO | 2010000949 | A1 | 1/2010 |

OTHER PUBLICATIONS

Elisa Plc's Press Release; Innovative Solution Receives 2004 European Good Practice Award in Occupational Health and Safety and the appendix BookIT case.pdf; Nov. 22, 2004.

Penttinen; GSM-tekniikka; WSOY; Unknown 1999; pp. 155-157, 222 and 331-332; Porvoo.

Content Gateway, Version 4.0. "Development and Billing manual," Jan. 1, 2005, Telia Sonera Finland Oy, www.sonera.fi/files/sonera.fi/.

Elisa Plc's press release. "Bookit Ltd and Elisa implement a handy mobile phone-enabled check-in service for Finnair," Jun. 9, 2004, www.elisa.fi.

(56) References Cited

OTHER PUBLICATIONS

Empower Interactive Group Ltd. "Virtual Mobile Redirector—Product Information Document," Unknown 2001.
Finnair Plc's press release. "Finnair to introduce the world's easiest check-in-with a text message," Jun. 9, 2004, www.bookit.net/news.
Finnish Search Report, dated May 4, 2006.
Finnish Search Report, dated Jun. 3, 2009.
Mobileway."Mobileway launches its Mobile Transaction Tracker solution—an interactive platform to authenticate macropayment made by mobile consumers," Jul. 2002, pp. 1-2, United States.
Kauppalehti, "Mobiilipalvelujen oltava yksinkertaisia: BookIT:n. Jukka Salonen uskoo tavallisiin tekstiviesteihin," Heikki Nenonen, Jun. 9, 2005, p. 19.
Mouly et al. "The GSM System for mobile Communications," Unknown 1992, pp. 556-560, Palaiseau.

* cited by examiner

METHOD AND SYSTEM FOR SENDING MESSAGES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS REFERENCE TO RELATED APPLICATIONS*

*This patent application is a continuation reissue application of co-pending U.S. patent application Ser. No. 14/519,655, filed 21 Oct. 2014, which is a reissue of U.S. patent application Ser. No. 13/002,512, filed 9 Feb. 2011, now U.S. Pat. No. 8,825,774, which is a National Phase of International Patent Application No. PCT/FI2009/050611, filed 3 Jul. 2009, which claims priority to Finnish Patent Application No. 20085701, filed 4 Jul. 2008, the disclosures of which are incorporated herein by reference in their entirety. U.S. patent application Ser. No. 14/519,655 and the instant application are reissue and continuation reissue applications, respectively, of U.S. Pat. No. 8,825,774.*

The present invention relates to a method, according to the preamble of claim 1, for sending messages.

The invention also relates to a system according to claim 26.

Methods and systems of this kind are used, for example, in the implementation of text-message-based ordering or booking services.

The prior art is described in, among others, the applicant=s own patents FI-117663, FI-118586, and FI-118585, and in EP patent application 03792441.

These patents disclose solutions, in which, in connection with services requiring many pairs of queries and replies, the management of the dialogue can be most advantageously resolved using simple text-message technology, which is available to all mobile telephone users.

In these solutions, a so-called DDM matrix is used, in which the intelligence of the service dialogue has been transferred to the service system, in such a way that the service provider always changes the reply address (typically a telephone number) according to the stage of the dialogue, so that, even in a discontinuous dialogue of long duration, the service provider knows both who has responded to a question in the dialogue and at which stage in the dialogue.

In these, as such highly developed solutions, it has not been simple to implement all services.

The invention is intended to eliminate the defects of the state of the art described above and for this purpose create an entirely new type of method and system for the sending, particularly the bulk delivery of messages, as well as to preferably provide a service for international use.

The invention is also intended to provide methods and means, with the aid of which it is possible to achieve a simple and clear way of providing services in multi-channel communications.

In addition, the invention is intended to create methods and means, by means of which a query and service can be sent to a customer through different communications networks.

In a preferred embodiment of the invention, messages, such as text messages are used in a dialogue, in which content services are delivered to the customer. The services are provided typically using the service provider's means of payment, such a bonus points. If the customer and service provider have a mutual agreement concerning other means of payment, these can also be used to bill the customer.

The invention is based on the desired reply address, typically the sender data of each message sent, typically by bulk delivery, is changed to correspond to a predefined dialogue, in which the stage of the dialogue determines unequivocally the sender data, in which case the sending and reception of the messages are implemented in different parts of the telecommunications network and the user is permitted to respond in only one way, so that the service is delivered in response to the billing of the means of payment used by the service provider.

One preferred embodiment of the invention is based on the reception, at the sender address defined in the in the previous stage of the dialogue, or an address contained in the message, in the message dialogue, of a message from the user over a second telecommunications channel (data connection, VOIP connection, WAP connection, or internet connection) and on proceeding according to the contents of the message. If necessary, the next text-format message of the session is sent to the user of the message service, in such a way that the sender address (e.g., the A number) is changed to correspond to the session number and a new session stage.

According to one preferred embodiment of the invention, the interval in time between the first offer message and the following message depends of the content, size, or temporal duration of the repetition of the service delivered.

In one preferred embodiment of the invention, the service is delivered using a communications channel differing from the telephone connection.

In one preferred embodiment of the invention, the service is delivered to some other terminal device of the user.

More specifically, the method according to the invention is characterized by what is stated in the characterizing portion of claim 1.

The system according to the invention is characterized, for its part by what is stated in the characterizing portion of claim 26.

Considerable advantages are gained with the aid of the invention.

The solution is operator-independent and will operate in the networks of all operators. The most typical applications of the invention will operate in any GSM customer telephone whatever, in any network whatever. The invention offers a cost advantage thanks to the bulk delivery while reception, however, operates entirely country-independently, i.e. completely in a roaming mode from the network of each operator. In addition, the system permits the service provider to provide paid services to existing customers, without risk.

The adjustment of the interval between messages permits both optimization of the technical capacity of the telecommunications network and the optimization of the delivery and acceptance of the messages.

The service can be delivered flexibly to many different terminal devices.

In the following, the invention is examined with the aid of examples and with reference to the accompanying drawings.

Figure 1:
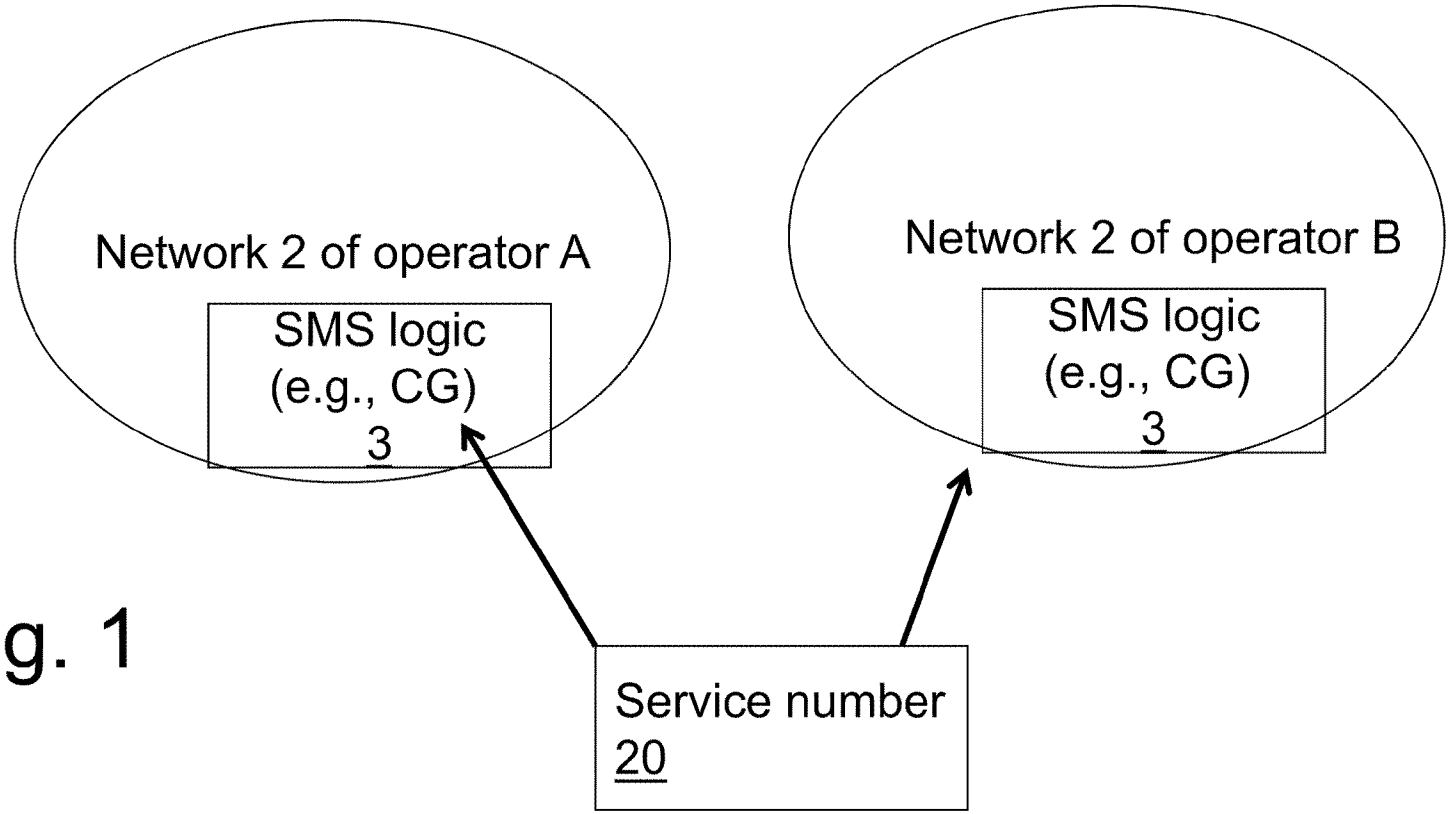
FIG. 1 shows schematically a solution according to the prior art.

In the prior art according to FIG. 1, telephone operators A and B have in their own networks text-message bulk-delivery means 3, by means of which each operator can efficiently send large numbers of text messages. In the solution shown, each operator has a common service number 20, which is arranged by agreement, and circuit technology relating to the message service, which is not available to operators not party to the agreement. According to the prior art, the service number 20 is a non-roaming short number.

Figure 2:
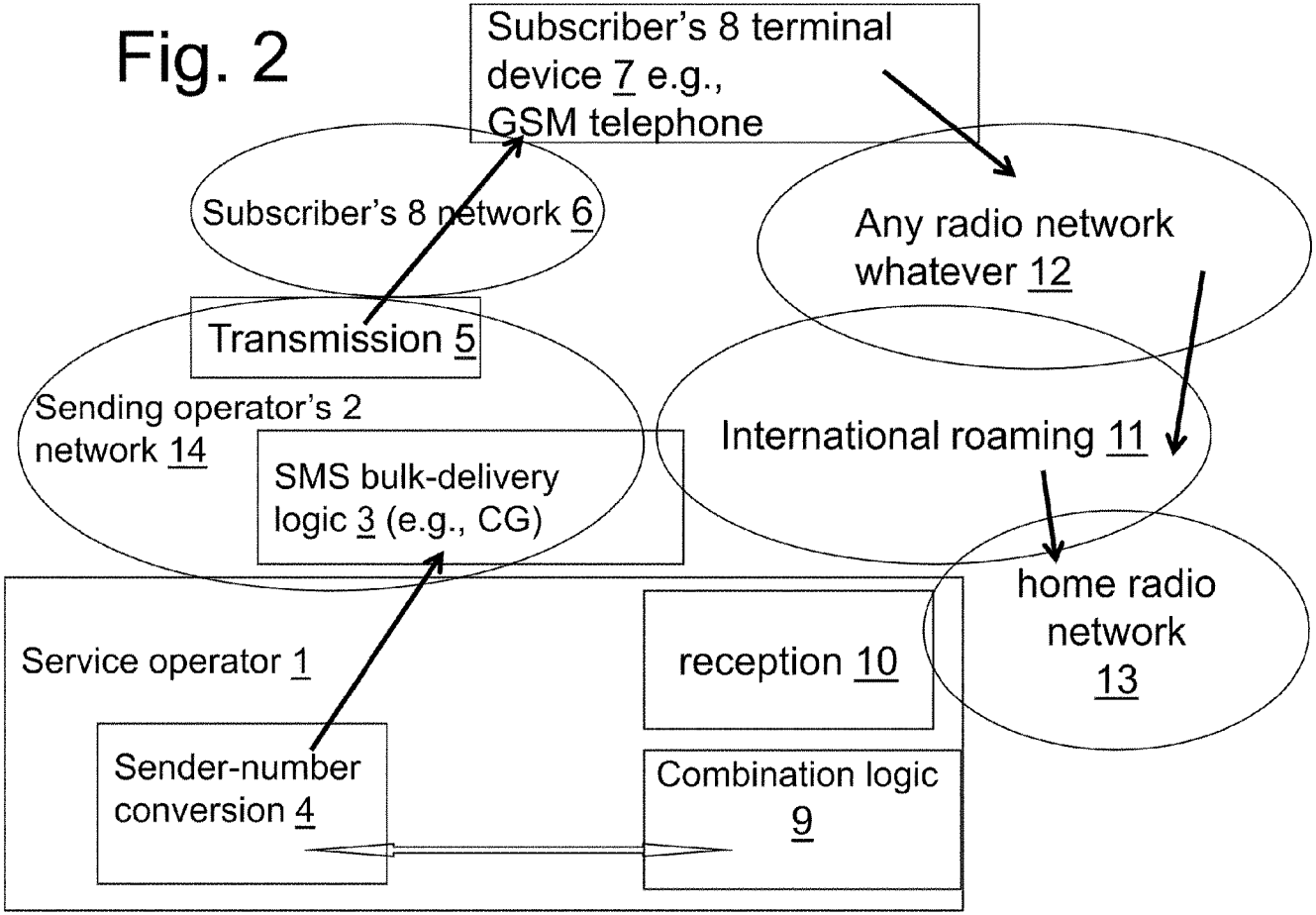
FIG. 2 shows a block diagram of the solution according to the prior art

In the system according to FIG. 2, there are typically two parties, which, in exceptional cases, can be the same company.

The service company or association 1 provides a service, which provides subscribers 8 with, for example, a registration service for buying tickets, changing tyres, etc. The service company or association 1 operates in a radio network, the home network 13 of some operator.

In the present application, the term service company or association 1 refers to an association or company, which operates in either its own or an extraneous network, producing services for customers either directly or indirectly. Typically, such a company or association is a sub-contractor of an actual telephone operator, nor does a user of the service necessarily even know of the existence of the service company or association 1. In a preferred embodiment of the invention, the service company or association produces either directly or indirectly many kinds of registration and booking services for telephone subscribers.

The system also includes a telephone operator 2, in whose network 14 there are means and equipment for the bulk delivery of digital messages (such as SMS messages) containing sender data. Such a practical network element is, for example, SMS bulk-delivery logic 3, which can be implemented using, for example, Content Gateway technology.

Figure 3:
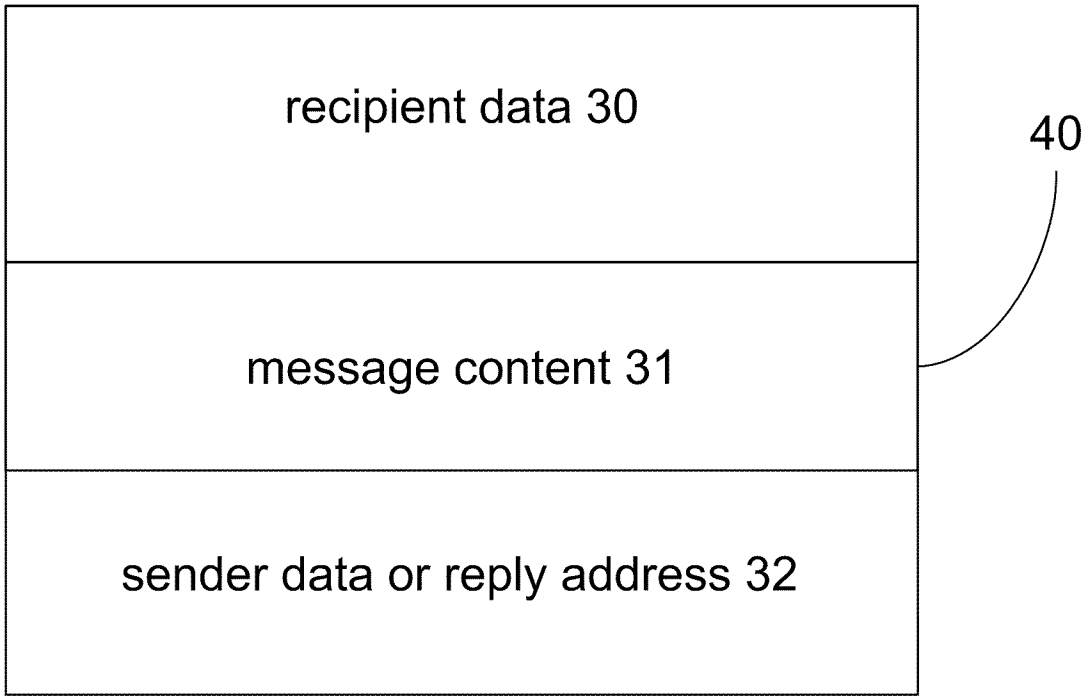
FIG. 3 shows schematically the data field in a message according to the invention.

With reference to FIGS. 2 and 3, in the first stage the service company or association 1 uses connection logic 9 and number adaptation 4 to form a large number of messages 40, each of which contains recipient data 30, the actual message content 31, and information 32 on either the send or, in practice, the address to which a reply to the message 40 is desired. In an SMS (short message system) application, the recipient data 30 is the telephone number of a mobile station while the sender data 32 is the sender data in the sender field of the SMS-message sender field 32 converted by a number converter 4.

Within the scope of the invention, the message 40 can be any message whatever that can be sent through a digital data network, and which comprises recipient data, the actual message, and the desired reply address, for example, in the form of sender data. Such messages 40 can be not only SMS messages, but also, for instance, email messages or multimedia messages (MMS).

A large number of the aforementioned messages are formed dynamically on the basis of complex dialogues.

When altering the desired reply address, for example, the sender=s number, the address (or number) from which the contact to the service company or association 1 has been made can be taken into account. Thus, the messages of subscriber=s 8 in the USA can be routed to their own national server while correspondingly the messages of Finnish users of the same service are routed to their own national server. From these national servers, the reply messages can be transferred over suitable telecommunications links for further measures by the service company or association 1.

The messages created by the service company or association 1 are sent to the bulk-delivery logic 3, which is located in the network 14 of the operator 2, from which the bulk delivery 5 of the messages is implemented. From there, the messages 40 disperse always according to the recipient data 30 and arrive at the terminal device 7 of the subscriber 8 through the subscriber's 8 radio network 6 at the time. The subscriber 8 replies to the message using the 'reply' function, when the reply message is sent to the address that determines the value of the sender or reply-address field 32 of the incoming message. The message 40 goes to the service company or association 1 over the radio networks 12, 11, and 13. Naturally, if the subscriber 8 is in the area of the home network 13 of the service company or association 1, the message will not travel over the networks 11 and 12. From the home network 13, the message is transferred to the message reception of the service company or association, where it is combined with a suitable dialogue with the aid of combination logic 9 and number conversion.

More concretely, for example in an SMS application, when a message is sent to the subscriber 8, the sender number (A number) is altered before bulk delivery in block 4, for example to +35850001, in the first stage of a predefined session (dialogue). The number space of the sender number (A number) is defined by the service provider's own number space, which in the invention is entirely independent of the operator's 2 number space. In the next stage of the same session, the A number is guided by the logic 9 of the service company or association 1 to be, for example +35850002, and so on. The sending A number is defined strictly from a logically progressing dialogue created by the service provider 1, in which the reply to each message sent is expected at a specific telephone number (digital reply address), which is included in the outgoing message as the A number.

Thus, the subscriber replies to the SMS message using the reply function, in which case in the first stage of the dialogue the reply goes to the number +35850001 and correspondingly in the second stage of the dialogue to the number +35850002.

Example of a dialogue:

| Message | Sender number |
|---|---|
| 1. do you want to download a piece of music? reply y/n | +35850001 |
| 2. do you want to download the video of the piece you heard? reply y/n | +35850002 |

The subscriber's 8 reply 'y' sends the message 2 of the service provider's 1 system. The dialogue terminates, if the reply to the first message is 'n'.

Thus the messages described above are sent to several recipients at one time, in which case the A number (=field 32) of the first stage of the dialogue would always be +35850001 and correspondingly in the second stage of the dialogue always +35850001, so that the reply to each message sent will always be assigned to the correct number. In connection with the reply, the sender's 8 A number defines to whom the booking will be made.

According to the invention, the preferred embodiment is an SMS message, but, according to the invention, the message can also be some other form of digital short message, in which the message can be replied to, without separately defining the recipient. Thus, instead of telephone-number data, the sender or reply address field (field 32 in FIG. 3) of the message can contain the desired reply address in some other form, for example, as an email address, or as numerical or alphanumerical sender or reply address data.

Thanks to the number conversion, the reception of the message takes place typically in an open radio network (or alternatively e.g., in a wireless local network, such as a WLAN or similar) external to the network of the operator 2 sending the message and is routed on the basis of the A number to the system of the service company or association 1.

Thus, in the invention in the SMS application, prior to bulk delivery the data in the 'sender' field of the text message being sent is altered, in such a way that the value entered in it is different to the sender's real number. This value is obtained from the logic 9, 10 of the service company or association 1, according to a predefined rule, in such a way that the questions and replies arriving at the logic can be linked.

In addition, in the system of the service company or association 1, there is logic 9 connecting the sending end and the receiving end, which can link a sent message and its incoming return reply from the external operator 2, in such a way that a subscriber can reply (from outside the network) from any subscription at all, but, however, sending can be done from inside the network at a high capacity and economically. In other words, the cheapest sending operator can be selected, but reception can be from any data network whatever.

According to the invention, at the message-receiving end it is possible to distribute the reception in such a way that, for example, in Sweden reception takes place at a local network element and correspondingly in Finland at a Finnish network element, from which national network elements the messages received are transferred over suitable links, for example IP links, to the system of the service company or association for further processing. The international roaming of the service will then be faster and cheaper, as well as more reliable. In addition, it is more pleasant for a consumer to use the service, because sending takes place to the number of a local operator and not to the network of a foreign operator, which is perceived to be expensive. In some subscriptions, foreign text messages may even be blocked, i.e. they will not operate without the service according to the invention.

Figure 4:
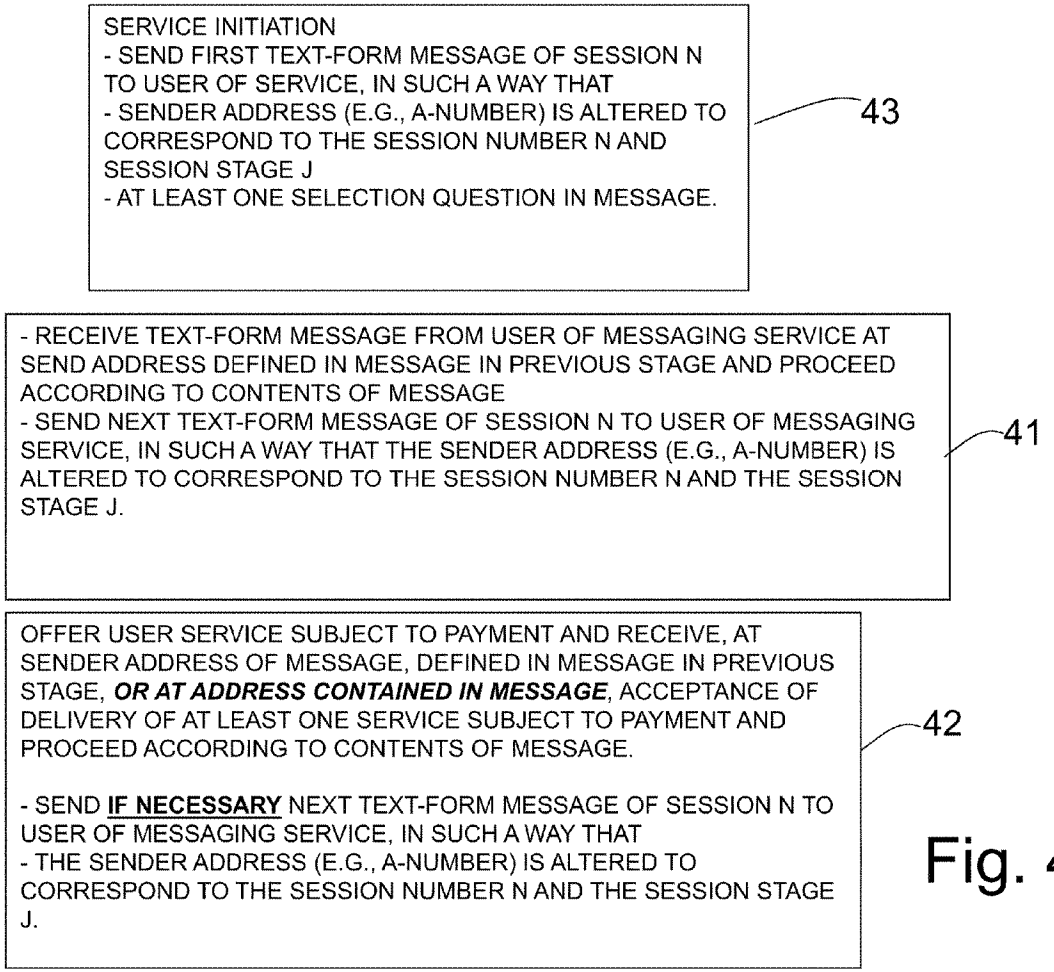
FIG. 4 shows a block diagram of the solution according to the invention.

According to FIG. 4, the solution according to the invention is implemented as follows.

A logically continuous, but temporally discontinuous session N of long duration is implemented as follows. The session N is divided into sub-stages J (43, 41, 42), which are typically temporally separated from each other. The session N itself is, however, logically continuous, in other words the queries and replies proceed logically over the entire session.

The service relating to the session N is initiated in block 43. The first text-form message of the session N is then sent to a service user, in such a way that the sender address (e.g., the A number) is altered to correspond to the session number N and the session stage J.

Block 42 depicts the stages 2-n of the session N, in which a text-form message to the sender address defined in the message in the previous stage is received from the user of the message service, and which proceeds according to the contents of the message, in such a way that the sender address (e.g., A number) is altered to correspond to the session number N and the new session stage J. Next, the next text-form message of session N is sent to the user of the message service.

According to block 42, an additional stage according to the invention is implemented at some stage of the process, in which the service provider offers a service subject to payment and, in reply to this offer message, acceptance of the delivery of the service subject to payment is received from the user of the message service.

Figure 5:
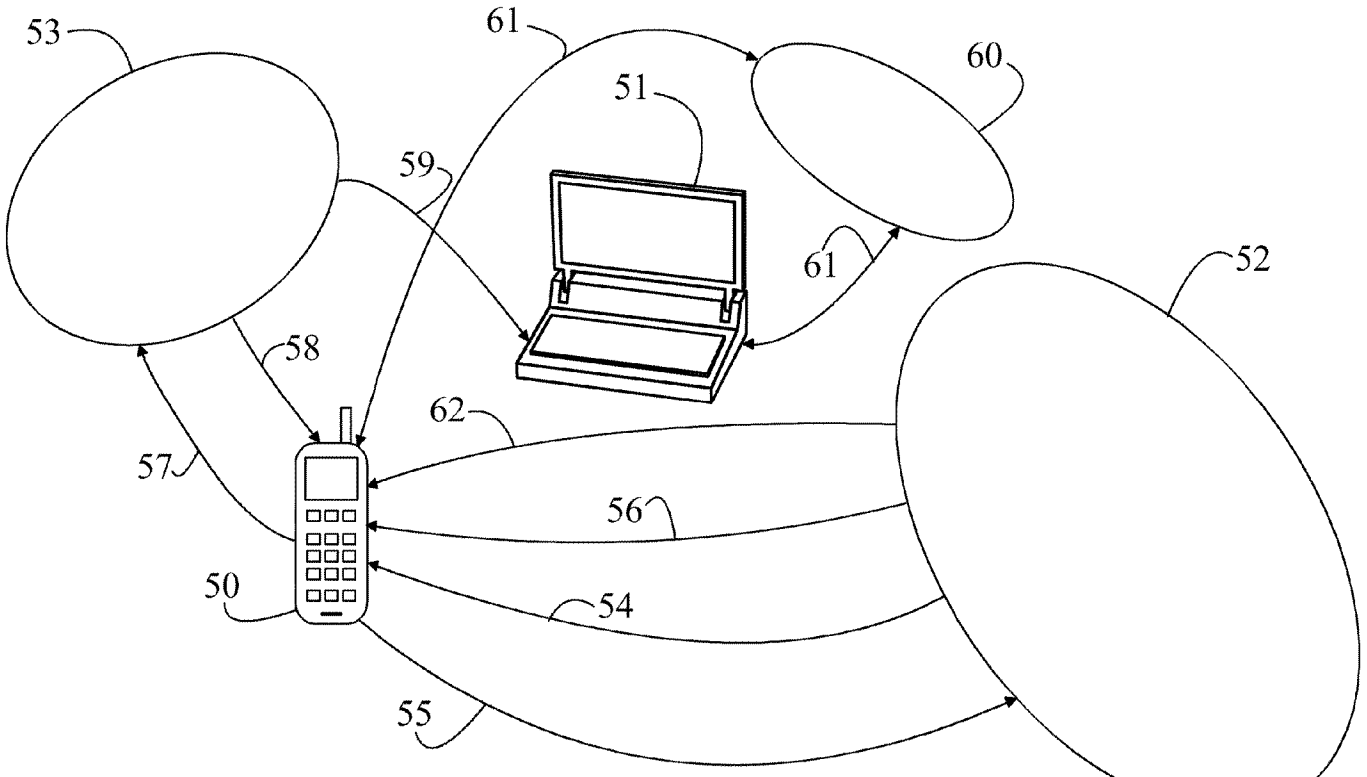
FIG. 5 shows schematically the system according to the invention.

According to FIG. 5, the method and system according to the invention can be applied in an environment, in which there is a service provider 52, for example an airline. In addition to this, there are several users, of which the figure shows one user, who has two terminal devices, a mobile telephone 50 and a laptop or palm computer 51. In addition, the figure shows the service producer 53 and the public internet network 60. Instead of the internet network, it is also possible to use, for instance, a WLAN network, or a corresponding telecommunications network.

The method according to the invention proceeds in such a way that the service provider typically approaches the mobile stations 50 of several users and sends an offer 54 of a service, for which payment will be made using the service provider's own means of payment, such a bonus points (or frequent-flyer miles). The user is given the chance to reply and the delivery process of the service typically initiates only if an unequivocal acceptance message is received from the user 50, for example, 'y', 'yes' or some other corresponding short message, for example in the form of a text message.

Once the process has been initiated by the unequivocal message, the service is sent, either directly as a download 56 to the mobile telephone, or alternatively the message 56 can be a text-message link to some other telecommunications system, such as the link address of the service provider 53, from which the actual service such as music or an image is downloaded by means of a return message 58. The connection from the mobile station 50 to the system 53 can be based on WAP, WLAN, or some other suitable technology.

Because the service provider has typically comprehensive information on the data of its customer, such as the service profile and the available technology, the service can be delivered 59 directly to the second device 51 of the user, or in parallel to both the telephone 50 and the computer 51 of the user.

In the solution of FIG. 5, the first offer message 54 is followed by a second service offer message 62, which is preferably sent after a delay relative to the first message 54 that corresponds to the combined time of the delivery and use of the first service to be delivered. Typically, this transmission delay can be the duration of the delivered music or video performance, added to the time taken to send the service. In streaming services, in which the service is delivered as a bit stream after the acceptance of the service, the delay is correspondingly the time between the acceptance and the termination of the bit steam. In the present application, the term streaming refers to a term generally used in the field, in which previously ordered material is delivered to the user or customer as an essentially continuous data stream suitable for use immediately. The definition thus differs from a file download service, in which the user or customer of a data network downloads a file and uses the service contained in the downloaded file with the aid of their own software, when the need for use arises, without the transfer services of a data network.

Generally, it can be said that in the present system existing technology is mainly used to initiate the dialogue of text messages. File downloads, on the other hand, are typically implemented by data communications, for example, by exploiting a suitable communications channel in multi-channel operation. In the example of FIG. 5, the data links are typically used in the messages 57, 58, 59, and 61, whereas the message 54, 55, 56, and 62 are typically text messages.

Particularly when network and terminal-device technology develops, it will naturally be possible to implement solutions, which may deviate from the general principles described above.

In terms of practical implementation, a problem is the estimation of the real amount of the delay, because both the telecommunications network and the service user too can be loaded and the time greater than the optimal time permitted by the telecommunications network.

Thus, according to one embodiment of the invention, the transmission delay between the first 54 and the second 62 offer messages is defined on the basis of the contents or type of the service.

According to one preferred embodiment of the invention, the transmission delay is typically defined as the sum of the typical reproduction time and the typical transfer time.

According to a second preferred embodiment of the invention, the transmission delay is defined as a function of the file size.

According to a third preferred embodiment of the invention, the transmission delay is defined according to the file type.

In the following is an example of one dialogue:

| Message | Sender number |
|---|---|
| 1. Do you want to use your bonus points to download music at a price of 500 p/piece? y/n | +35850001 |
| 2. Reply 'y' to number | +35850001 |
| 3. Delivery of service | |
| 4. New message at a delay proportional to the content to the same customer number 'Do you want to download a new piece or video?' | +35850005 |
| 5. Reply 'y' to number | +35850005 |

According to the invention, a service can be implemented as a group message at an airport as a group message to those going to one aircraft and, after this, the service dialogue can be tailored in the aircraft in the area of coverage of the aircraft's base station, on the basis of the replies and choices of the individual users.

A single user can naturally have more than two terminal devices.

The services can be music, image, or video content, or search services, dictionary services, or similar. Within the scope of the invention, providing a service against payment can also comprise the user agreeing to receive advertising material in lieu of payment for the service.

In the present application, the term sender data refers both to a telephone number (A number) and to any information whatever of the desired return address transported with the message.

The method and system according to the invention are implemented with the aid of at least one computer in telecommunications networks.

According to the invention, the sender address can also be an IP address.

Some preferred embodiments of the invention are described in the following.

Preferred Embodiments of the Invention:

In principle, all preferred embodiments described in the following are associated with the query and reply addresses (numbers/IP addresses, etc.) being able to be combined with a specific question. The timing of the transmission of a new question can be made in several different ways. Alternative ways include timing relative to the time taken to transfer the file and the time taken to download, in which case the timing delay can be directly the sum of these times or proportional to them. It is also possible to use a transmission delay, which is the sum of the transfer time and the reproduction time added to a constant amount of additional time. The additional time will be necessary, if, for example, the transfer speed of the data network is not stable. Alternatively, the timing delay can always be of a constant magnitude according to the message type. The queries can be also be sent nearly simultaneously, or alternatively a sign (bit, flag, etc.) can be attached to the file to sent, and sent back to the service provider one the download/listening/viewing has taken place. The last alternative may require a short program to be installed in the terminal device, so that the notification in question can be send to the service provider.

The embodiments are described with reference to FIG. 5.

In one embodiment of the invention, the offer message 54 is sent (as a text message) from the service provider to the customer (do you want a certain piece or video). Transmission can take place, for example, over a GSM network.

Customer replies 55 y/n.

The piece or video is sent 56, 58, 61 to the terminal device 50, 51 (cellphone or otherwise defined terminal device, e.g., laptop computer) of the customer. The piece or video is delivered, e.g., over a data connection.

After a specific time, a second message 56 is sent to the customer (with a different reply address to the first message), in which the customer is asked if they want a new piece or video (piece or video offered can be selected, e.g., on the based of previous selections by the user, on the basis of the user's profile, etc.).

The customer replies y/n.

If the customer replies y, the aforementioned series of stages can start from the beginning in the case of a new piece or other service.

According to another embodiment of the invention, an offer message is sent (as a text message) 54 from the service provider 52 to the customer (do you want a specific piece or video). The service can be implemented, for example, through a GSM network.

The customer replies y/n.

The customer is sent a text message 56, in which an individuated IP address 57 is given, from where they can fetch the piece or video.

After a specific time, a new query message 62 is sent with a different reply number.

The aforementioned process is repeated concerning the delivery of new queries and products.

According to another embodiment of the invention, a query message 54 is sent, for example over a local network in an aircraft, to customers who are within the coverage of the network (the message can be sent either to a cellphone or a computer, etc.).

The customer replies 55 y/n.

A file is sent to the customer 56, 58, 61.

A new query 62 is sent to the customer. In this query, there is a different reply address to that in the previous sent message.

The process is continued in the manner described above in the case of the second service (piece of music, or similar).

In all of the above cases, the timing of the transmission of the next message can be predefined. For example, a new message 62 is sent at two-hourly intervals, or the message is sent immediately after the reception of the previous reply. The situation can also be such that, after the reception of the first reply, new messages are sent to the customer at short intervals. In that case, in all of these messages there should be different reply addresses, so that it is possible to identify the question to which the customer is replying.

In addition, the cases described above can also be performed using other messages than text messages.

If the piece of music or video is delivered directly to the customer's telephone, the service provider must known whether the customer's telephone supports transmission and performance formats of the kind used. This can be determined from the service provider's customer profile, provided these data are maintained sufficiently actively. The service provider's customer profile can also contain information on whether the customer has in use several different types of terminal device, such as palm computers, laptop computers, or smart telephones.

If the aforementioned services are offered in a single aircraft or otherwise restricted area, this system should also include a possibility for several numbers/addresses to be used as reply addresses. In that case, it is possible, for example, to implement a number pool in the aircraft's server, which will then act as the service supplier.

In another embodiment of the invention, if the service provider is, for example, an airline, which has its 'own' subscription and sufficiently comprehensive information on the customer and connections to, for example, travel agents and/or hotels and/or taxi firms, etc., the following kind of embodiment can also be taken into account.

A customer books a flight from Helsinki to Berlin. If the customer checks in using their cellphone, the service provider can send them various kinds of message. The messages can contain, for example, ordering a taxi to be ready at the airport when the flight lands in Berlin, booking a hotel, and many other possible functions. When the customer lands in Berlin, switches on their cellphone and the cellphone registers on a network, offers can be made to them concerning, for instance, music, videos, ordering a taxi, hotel booking, etc.

At a principle level, the process then proceeds as follows:

The customer receives a message(s) from the service provider of the airline (either the airline itself or a service provider acting as its agent), by replying to which they can check in using their own cellphone. The service provider then knows the destination and time of travel of the customer.

When the customer lands at their destination and switches on their cellphone (when connection to a network takes place), the service provider sends a text message 54, in which it offers services to the customer (taxi, piece of music, video, hotel, map service, etc.).

The customer replies whether they wish to receive the service.

If the customer replies yes, the service is delivered to the customer.

The service provider 52 sends the following query from a different reply number to the first query, so that the system knows the question to which the reply is made, who has replied, etc.

The invention is not restricted to the embodiments described above, which are only example, of the invention described in the Claims. Thus, one skilled in the art will be able to made several alternative solutions, without leaving the scope of protection described in the Claims.

Thus, for example, the message can be, according to the invention, also a multimedia message (MMS) instead of an SMS message. The message type can vary within the invention, in other words it can start as a multimedia message and use at least one text message as a further message, or vice versa.

The invention claimed is:

[1. A method comprising:

sending, in a telecommunications network, to a mobile terminal, a text-form message, wherein the text-form message relates to a current session and a current stage of the current session within a predefined dialog including a plurality of stages in which the current stage of the predefined dialog determines a sender address of the text-form message, wherein the sending comprises altering the sender address of the text-form message, and wherein the altered sender address is determined based on a combination of a session number of the current session and the current stage of the current session; and receiving, at the altered sender address or at an address contained in the sent text-form message, a reply message from the mobile terminal, wherein the predefined dialog proceeds based on contents of the reply message, wherein the reply message is a service order message, which is associated with at least one order for a supplementary service, and which is subject to payment, and wherein the method further comprises initiating delivery of the supplementary service over a communications channel that is not used to send or receive the text-form messages.]

[2. The method of claim 1, further comprising repeating the sending and receiving for at least one subsequent current stage of the session, wherein the repeating comprises further altering the sender address of the text-form message based on the at least one subsequent current stage and sending the text-form message with the further altered sender address.]

[3. The method of claim 1, wherein the text-form message comprises a Short Message Service message.]

[4. The method of claim 1, wherein the text-form message comprises a Multimedia Message Service message.]

[5. The method of claim 1, wherein the text-form message comprises an electronic mail message.]

[6. The method of claim 1, wherein each of the sender addresses comprises an Internet Protocol Address.]

[7. The method of claim 1, wherein the altering of the sender address of the text-form message comprises altering the sender address to an address operative in the mobile terminal's home network or country.]

[8. A telecommunications apparatus comprising:

a processor coupled to a memory executing:

a transmission system for sending, in a telecommunications network to a mobile terminal, a text-form message, wherein the text-form message relates to a current session and a current stage of the current session within a predefined dialog including a plurality of stages in which the current stage of the predefined dialog determines a sender address of the text-form message, wherein the telecommunication apparatus further comprises a sender-address altering system for altering the sender address of the text-form message, wherein the altered sender address is determined based on a combination of a session number of the current session and the current stage of the current session; and a reception system for receiving, at the altered sender address or at an address contained in the sent text-form message, a reply message from the mobile terminal, wherein the predefined dialog proceeds based on contents of the reply message, wherein the reply message is a service order message, which is associated with at least one order for a supplementary service that is subject to payment, and wherein the telecommunication apparatus further initiates delivery of the supplementary service over a communications channel which is not used to send or receive the text-form messages.]

[9. The apparatus of claim 8, wherein the apparatus repeating the sending and receiving for at least one subsequent current stage of the session, wherein the repeating comprises further altering the sender address of the text-form message based on at least one subsequent current stage and sending the text-form message with the further altered sender address.]

[10. The telecommunication apparatus of claim 8, wherein the text-form message comprises a Short Message Service message.]

[11. The telecommunication apparatus of claim 8, wherein the text-form message comprises a Multimedia Message Service message.]

[12. The telecommunication apparatus of claim 8, wherein the text-form message comprises an electronic mail message.]

[13. The telecommunication apparatus of claim 8, wherein the sending alters the sender address of the text-form message to an address operative in the mobile terminal's home network or country.]

[14. The telecommunication apparatus of claim 8, wherein each of the sender addresses comprises an Internet Protocol Address.]

[15. The telecommunication apparatus of claim 8, wherein the telecommunication apparatus comprises an SMS bulk-delivery system.]

[16. The method of claim 1, wherein the sending comprises altering the sender address of the text-form message based on the current stage of the session for each of several mobile terminals.]

[17. The telecommunication apparatus of claim 8, wherein the sender-address altering system alters the sender address of the text-form message based on the current stage of the session for each of several mobile terminals.]

*18. A method comprising:*

*sending, in a telecommunications network, from a network server to a mobile terminal of a user, a first offer message that relates to a first service event and is a text-form message, wherein the first offer message relates to a current session and a current stage of the current session within a predefined dialog including a plurality of stages in which the current stage of the predefined dialog determines a sender address of the first offer message, wherein the sending comprises altering the sender address of the first offer message to provide a first reply address, and wherein the altered sender address is determined based on a combination of a session number of the current session and the current stage of the current session;*

*receiving by the network server, at the first reply address which is the altered sender address in the sent first offer message, a reply message from the user's mobile terminal,*

*wherein the predefined dialog proceeds based on contents of the reply message, wherein the reply message is a service order message, which is associated with at least one order for a supplementary service and subject to payment,*

*wherein the method further comprises initiating delivery of the order over a communications channel that is not used to send or receive the text-form messages, and*

*wherein, in response to the reply to the first offer message indicating acceptance of the first offer message, the network server initiating delivery of the first service event to the user, and the network server sending a second offer message to the mobile terminal of the user, wherein the second offer message indicates a second reply address, which is distinct from the first reply address.*

*19. The method of claim 18, wherein the reply to the first offer message comprises an order for a supplementary service, which is subject to payment, and the method further comprises initiating delivery of the supplementary service over a communications channel that is not used to send text-form messages.*

*20. The method of claim 18, wherein a reply to the second offer message comprises an order for a supplementary service, which is subject to payment, and the method further comprises initiating delivery of the supplementary service over a communications channel that is not used to send text-form messages.*

*21. The method of claim 18, wherein the network server sends the second offer message with a transmission delay, which is determined based on content or type of at least one of the first service event or a second service event, and*

*wherein the delivery and a performance of the first service event each have a duration and the network server sets the transmission delay to exceed a sum of the durations.*

*22. The method of claim 18, wherein the network server sends the second offer message with a transmission delay, which is determined based on content or type of at least one of the first service event or a second service event, and*

*wherein the first service event comprises digital content and the network server sets the transmission delay based on a size of the digital content.*

*23. The method of claim 18, wherein the network server varies the reply address indicated by offer messages unpredictably and positively authenticates the mobile terminal of the user or its user in response to the reply from the mobile terminal of the user being received at the unpredictably varied reply address.*

*24. The method of claim 18, wherein the delivery of at least one of the first service event and a second service event comprises sending a link to the mobile terminal of the user, wherein activation of the link at the mobile terminal of the user causes navigation of the mobile terminal of the user to a service provisioning computer from which the respective service event is retrievable.*

*25. The method of claim 24, wherein the network server receives the reply message to one of the offer messages from one mobile terminal of the user and sends the link in such a manner that the service event is retrievable at another mobile terminal of the user.*

*26. The method of claim 18, wherein the network server utilizes a bulk delivery system to send the offer messages.*

*27. The method of claim 18, wherein the network server customizes the offer messages based on a location or nature of a local-area network.*

*28. The method of claim 18, wherein the network server sends a proposal to the mobile terminal of the user that at least one service event is at least partially payable by bonus points of the user.*

*29. The method of claim 18, wherein at least one of the first and second offer messages has a format selected from a group consisting of a short message service message, an e-mail message and a multimedia message.*

*30. The method of claim 29, wherein the first and second offer messages have different formats selected from the group consisting of a short message service message, an e-mail message and a multimedia message.*

*31. A telecommunications network server comprising:*

*a processor coupled to a memory executing:*

*a transmission system for sending, in a telecommunications network, from the network server to a mobile terminal of a user, a first offer message that relates to a first service event and is a text-form message, wherein the first offer message relates to a current session and a current stage of the current session within a predefined dialog including a plurality of stages in which the current stage of the predefined dialog determines a sender address of the first offer message, wherein the sending comprises altering the sender address of the first offer message to provide a first reply address, and wherein the altered sender address is determined based on a combination of a session number of the current session and the current stage of the current session;*

*wherein the network server receives, at the first reply address which is the altered sender address in the sent first offer message, a reply message from the user's mobile terminal,*

*wherein the predefined dialog proceeds based on contents of the reply message, wherein the reply message is a service order message, which is associated with at least one order for a supplementary service and is subject to payment,*

*wherein the network server initiates delivery of the order over a communications channel that is not used to send or receive the text-form messages,*

*wherein, in response to the reply to the first offer message indicating acceptance of the first offer message, the network server initiates delivery of the first service event to the user and sends a second offer message to the mobile terminal of the user, and*

*wherein the second offer message relates to a second service event and indicates a second reply address, which is distinct from the first reply address,*

*whereby the network server serves as a mechanism for receiving text-form messages and altering the sender-address of the text-form messages.*

*32. The telecommunications network server of claim 31, wherein the reply to the first offer message comprises an order for a supplementary service, which is subject to payment, and the network server initiates delivery of the supplementary service over a communications channel that is not used to send text form messages.*

*33. The telecommunications network server of claim 31, wherein a reply to the second offer message comprises an order for a supplementary service, which is subject to payment, and the network server initiates delivery of the supplementary service over a communications channel that is not used to send text-form messages.*

*34. The telecommunications network server of claim 31, wherein the network server sends the second offer message with a transmission delay, which is determined based on content or type of at least one of the first or second service events, wherein the delivery and a performance of the first service event each have a duration and the network server sets the transmission delay to exceed a sum of the durations.*

*35. The telecommunications network server of claim 31, wherein the network server sends the second offer message with a transmission delay, which is determined based on content or type of at least one of the first or second service events, wherein the first service event comprises digital content and the network server sets the transmission delay based on a size of the digital content.*

*36. The telecommunications network server of claim 31, wherein the network server varies the reply address indicated by the offer messages unpredictably and positively authenticates the mobile terminal of the user or the user in response to the reply from the mobile terminal of the user being received at the unpredictably varied reply address.*

*37. The telecommunications network server of claim 31, wherein the delivery of at least one of the first service event and second service event comprises sending a link to the mobile terminal of the user, wherein activation of the link at the mobile terminal causes navigation of the mobile terminal of the user to a service provisioning computer from which the respective service event is retrievable.*

*38. The telecommunications network server of claim 37, wherein the network server receives the reply message to one of the offer messages from one mobile terminal of the user and sends the link in such a manner that the service event is retrievable at another mobile terminal of the user.*

*39. The telecommunications network server of claim 31, wherein the network server utilizes a bulk delivery system to send the offer messages.*

*40. The telecommunications network server of claim 31, wherein the network server customizes the offer messages based on a location or nature of a local-area network.*

*41. The telecommunications network server of claim 31, wherein the network server sends a proposal to the mobile terminal of the user that at least one service event is at least partially payable by bonus points of the user.*

*42. The telecommunications network server of claim 31, wherein the at least one of the messages first and second messages has a format selected from a group consisting of a short message service message, an e-mail message and a multimedia message.*

*43. The telecommunications network server of claim 42, wherein the first and second offer messages have different formats selected from the group consisting of a short message service message, an e-mail message and a multimedia message.*

* * * * *